3,238,243
PREPARATION OF 2,6-DICHLORO-
BENZONITRILE
Jurgen F. Falbe, Bonn, Hans-Dieter Scharf, Hennef, and Friedrich W. A. G. K. Korte, Hangelar, Germany, assignors to Shell Oil Company, New York, N.Y., a corporation of Delaware
No Drawing. Filed Dec. 10, 1962, Ser. No. 270,128
Claims priority, application Great Britain, Dec. 14, 1961, 44,908/61
4 Claims. (Cl. 260—465)

This invention relates to a process for the manufacture of polychlorobenzonitriles, especially 2,6-dichlorobenzonitrile, 2,3,6-trichlorobenzonitrile and 2,3,5,6-tetrachlorobenzonitrile.

2,6-dichlorobenzonitrile is a very useful herbicide, so that is is desirable that there be available at least one process for its preparation which can be readily practiced on a large scale. To be practically useful, such a process must begin with readily avialable low-cost starting materials which are readily converted to the desired nitrile. One class of starting materials which is available at reasonable cost in sufficient quantity for large-scale production of 2,6-dichlorobenzonitrile is 2-chloro-6-nitrotoluene. It can be converted to the 2,6-dichlorobenzonitrile by reacting it with chlorine (by a process such as is described in copending U.S. application Serial No. 155,840, filed November 29, 1961, now abandoned) to form the corresponding 2,6-dichlorobenzyl- and benzal chlorides. According to the present invention, these chlorides are readily and efficiently converted to 2,6-dichlorobenzonitrile by passing them in admixture with ammonia and a molecular oxygen-containing gas, in vapor phase, in contact with a large area of surface, this surface being supplied as a practical matter by an inert solid material providing the requisite surface in the reaction zone.

The process of the invention also effects conversion of other polychlorinated benzyl- and/or benzal chlorides to be corresponding polychlorinated benzonitriles. Thus, for example, the process of the invention effects conversion of 2,3,6-trichlorobenzal- and benzyl chlorides to 2,3,6-trichlorobenzonitrile, and effects conversion of 2,3,5,6-tetrachlorobenzal- and benzyl chlorides to 2,3,5,6-tetrachlorobenzonitrile. These latter benzonitriles also are useful as herbicides, or they may be hydrolyzed to the corresponding polychlorobenzoic acids, which are useful herbicides.

The process of this invention is applicable to the conversion of polychlorobenzal chlorides, polychlorobenzyl chlorides, and mixtures of polychlorobenzal- and benzyl chlorides to the corresponding polychlorobenzonitriles.

Polychlorobenzylchlorides and polychlorobenzalchlorides used as starting materials in the process according to the invention may be represented by the general formulae

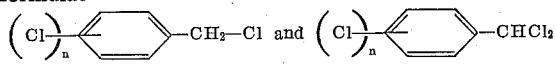

respectively, in which $n$ is an integer of from 2 to 5. Preferably $n$ is not more than 3, in particular 2. Examples of suitable starting materials are: 2,3,5,6-trichlorobenzylchloride, 2,3,6-trichlorobenzalchloride, 2,3,5,6-tetrachloro-benzylchloride. Preferred starting materials are 2,6-dichlorobenzalchloride and in particular 2,6-di-chlorobenzylchloride, or mixtures thereof.

The polychlorobenzylchloride and/or polychlorobenzalchloride may be used in chemically pure form or as a technical grade material, that is, impurities may be present in the starting material. With a view to minimum consumption of chemicals it is generally more efficient to employ a polychlorobenzylchloride as starting material.

The polychlorobenzylchloride and polychlorobenzalchloride starting materials may be obtained in various ways. Thus, 2,6-di-chlorobenzalchlorides may be prepared by chlorination of, e.g., toluene in the presence of a catalyst such as ferric chloride, followed by further chlorination of the isomeric dichlorotoluenes obtained in the presence of light but in the absence of catalyst. According to another method, Belgian Patent 610,998, chlorinated toluene derivatives such as, for example, 2,6-dichlorobenzal chloride and/or 2,6-dichlorobenzyl chloride may be obtained by heating 2,6-dinitrotoluene or 2-chloro-6-nitrotoluene with chlorine.

An attractive method for the preparation of the preferred starting materials, 2,6-dichlorobenzylchloride and 2,6-dichlorobenzal chloride: the easily obtainable starting material p-toluene sulfonylchloride is—in a first stage—chlorinated in the presence of a catalyst favoring nuclear substitution to the 2,6-dichloro-p-toluene-sulfonylchloride which—in a second stage—is hydrolyzed in an acid medium followed by spliting off the sulfonic acid group by further heating in the acid medium to obtain 2,6-dichlorotoluene which—in a third stage—is chlorinated in the side-chain to 2,6-dichlorobenzyl and/or benzalchloride. As a byproduct of this method the 2,3,6-trichloro-p-toluene-sulfonylchloride will be obtained.

The catalyst used in the first-stage chlorination may be, for example, iodine, iron, ferric chloride, the preferred catalyst being antimony trichloride. When using a stoichiometric amount of chlorine (2 mols/mole of p-toluene-sulfonylchloride), high yields of the 2,6-dichloro product may be obtained.

In the second stage a strong acid medium is desirable, a very suitable acid medium being obtained by addition of sulfuric acid of about 50% strength. The 2,6-dichloro-p-toluene-sulfonylchloride is heated under reflux in this medium until solution is effected, indicating total hydrolysis of the acid chloride. Subsequently the sulfonic acid group formed may be split off by further heating, suitably after concentration of the sulfuric acid to a strength of the least 60% by distillation with superheated steam. The distillation product comprising 2,6-dichloro-toluene can be used for the next stage without further purification. Recovered sulfuric acid can be used several times.

The third stage comprises chlorination of 2,6-dichloro-toluene under conditions favoring side-chain substitution. Ultraviolet irradiation is preferably applied. Side-chain chlorination may also be effected, though less effective, without irradiation by simply refluxing 2,6-dichlorotoluene with chlorine, no catalyst being present. The amount of chlorine to be used is preferably about 1 mole/mole of 2,6-dichlorotoluene, yielding mainly 2,6-dichlorobenzyl-chloride which is the preferred starting material in the process according to the invention. It may be used therein without further purification. By employing more than 1 mole—for example, 2 moles—of chlorine/mole of 2,6-dichlorotoluene, the amount of 2,6-dichlorobenzalchloride in the chlorination product will increase.

The conversion of the chlorides(s) to the nitrile is effected by mixing the chloride starting material, ammonia and a molecular oxygen-containing gas, and passing the mixture, in vapor phase, through a bed of a solid contact material providing a substantial amount of surface area in the reaction zone.

At least the theoretical amount of ammonia required to completely convert the chloride to the nitrile should be used, and in most cases it will be found desirable to employ an excess of ammonia, for this inhibits undesirable side-reactions. The amount of the excess which is required can vary from a very minor amount (for example, five percent, based on the number of moles of chloride charged) to several times (for example, up to five, six, or even ten times) the number of moles of chloride charged.

Any source of molecular oxygen can be used. The amount of molecular oxygen which is employed should be sufficient to react with the amount of hydrogen which is removed from the ammonia consumed in the reaction and from the halide consumed in the reaction (hydrogen will be removed from the methylene group of the benzyl moiety during the conversion to the cyanide group). Otherwise, the amount of oxygen used is not critical, and it is ordinarily desirable, to insure complete reaction with the hydrogen, to employ a moderate to large excess of the oxygen—for example, a 100 to 500% or even greater excess. In many cases it will be found desirable to include an inert gas in the reaction mixture to moderate the reaction. In such cases, air is suitable and is most convenient. In some cases, however, enrichment of the air with molecular oxygen may be found desirable. Other inert gases than nitrogen can of course be used.

The requisite surface in the reaction zone is provided by contact material which can be characterized as an inert, non-catalytic, solid material having a substantial geometric surface area relative to its volume. It must be thermally, mechanically and chemically stable in the reaction zone under the conditions. Suitable materials have a specific surface area of between 0.01 and 200 square meters per gram ($m.^2/g.$). Preferably, the material used has a specific surface area of at least 0.03, with the material desirably having a specific surface area of at least 1, with conversion of the chloride(s) to the nitrile being effected most efficiently with a material having a specific surface area of at least 2 square meters per gram. The contact material used should not have a specific surface area in excess of 200 since materials having a higher specific surface area tend to promote undesirable side reactions. Suitable materials include various glass and ceramic materials, both naturally occurring and synthetic; metals which are inert with respect to and not subject to corrosion by the reaction mixtures involved; silicon carbide, aluminum oxide (Alundum, corundum); silicia; boron nitride; firebrick; naturally occurring stony materials; pumice; coke, characoal and other forms of carbon; magnesia; kieselguhr and other forms of diatomaceous earth; asbestos; titanium dioxide and the like. Preferred because of their inertness in the reaction systems involved and because of their ready availability in a wide variety of physical forms at relatively low cost are the various forms of carbon especially coke, inactive siliceous materials and inactive forms of aluminum oxide. The siliceous materials which are suitable are those which do not have an "acid" surface, that is, materials which do not have an intrinsic surface acidity of the type found in typical clay-type cracking catalysts. Suitable siliceous materials within this definition include the various forms of silica which have not been activated, such as quartz and various forms and shapes of glass, naturally occurring stony materials, such as gravel, pebbles, stones, crushed rock, granite chips, fragments of volcanic glass, or the like, or such manufactured materials as granules, particles, fragments, chunks, pieces, filaments, extruded or molded shapes, or the like, of ceramic materials, glassy materials, porcelains, and so on, including Raschig rings, Berl saddles, porcelain tubes, porcelain or glass discs, solid or hollow spheres, porcelain or glass helices, spiral rings or the like, rock wool, chamotte, majolica, or the like. It is preferred that the contact material be a granular, substantially non-porous material, of such size distribution and shape(s) that when in place in the reactor, the bed of contact material has a porosity—that is, the ratio of the volume of voids in the bed, to the total volume of the bed—of from about 25% to about 65%. A particularly suitable packing material for use in reaction zones of restricted cross-sectional areas and a un-fluidized bed of contact material comprises quartz chips or other siliceous material, such as packing chips having a nominal particle size of from about ⅛ inch to about 3/16 inch diameter (i.e., 4 to 6 mesh). Depending upon the size and shape of the reaction zone, the size of the particles of the packing material may conveniently be somewhat smaller than this—e.g., to as small as one millimeter nominal diameter, or even less—or somewhat larger than this—e.g., up to 10 centimeters nominal diameter, or even greater. Methods for measurement of surface areas of solids, as well as data for specific materials, have been mentioned in P. H. Emmett, "Catalysis" (1954), vol. I, pages 31 ff.

The amount of contact material used is not critical. The essential criterion in each case is the provision of sufficient surface area in the reaction zone, taking into account the volume of the materials flowing through the zone, and the contact time that is required (as is hereafter discussed). In general, the kind and physical characteristics of the particular contact material—primarily the percent void space and the ratio of the surface area of the contact material to the void space—together with the required residence (contact) time of the reaction mixture in the reaction zone at the chosen conditions, will set the amount of contact material required. It will be appreciated that such factors as reactor geometry, relationship of void space, specific surface area of contact material, space velocity of the reaction mixture, and contact time and the like, are all factors which are often encountered in reactor design, resolution of which in any particular case of the use of the process of this invention will be straightforward in view of the disclosures of this specification.

According to the invention, the conversion of the chloride(s) to the nitrile is carried out in vapor phase at a moderately elevated temperature—that is, at a temperature of from about 200° C. to about 400° C. It has been found that the reaction temperature and contact time relationship has a definite effect on the yield of nitrile produced. Thus, it is usually desirable to employ temperatures above about 250° C., and reaction times of the order of 2 to 10 seconds. (It is to be understood that the process of the invention is wholly operable employing lower temperatures and longer reaction times; the foregoing, and following, discussion of time-temperature relationships has a bearing only on the obtention of maximum yields of nitrile and for very practical reasons, other conditions may be found more desirable than those which necessarily produce an optimum yield of nitrile.) In the case of 2,6-dichlorobenzal- and benzyl chlorides, temperatures within the range of from about 275° C. to about 325° C. have been found most suitable, with temperatures between about 300° C. and 310° C. being most suitable for conversion of 2,6-dichlorobenzal chloride, with a corresponding reaction time in the range of from about 5 to 10 seconds. At higher temperatures, for example temperatures of about 340° C., reaction time preferably should be shorter, of the order to 1 to 5 seconds. When converting 2,6-dichlorobenzyl chloride, the reaction temperature preferably is maintained at about 290° C. to about 310° C., with a reaction time of about 4 to 10 seconds, preferably about 8 to 10 seconds. When employing mixtures of 2,6-dichlorobenzyl chloride and 2,6-dichlorobenzal chloride, reaction temperatures of between 275 and 325° C. and contact times of 4–10 seconds are preferred.

The conversion of the chloride(s) to the nitrile can be carried out batchwise, or continuously, and may be carried out employing a fixed bed of the contact material, or in a bed of the contact material fluidized by one or more of the reactants.

Recovery of the nitrile product is accomplished by the usual means. In most cases, it will be found convenient to recover the nitrile by condensing and then extracting the final reaction mixture with a suitable selective organic solvent for the nitrile product, then separating the organic phase from the aqueous phase (present because of reaction of the oxygen with the hydrogen from the amine dehydrogenation) and recovering the nitrile from the organic phase by distillation techniques. Where, as many times will be the case, the final reaction mixture contains unreacted amine, and the amine boils at a temperature close to the boiling point of the nitrile, recovery of the nitrile by distillation may be difficult, and may be more conveniently effected by treating the organic phase (from the extraction of the crude final reaction mixture) with an aqueous solution of an acid, such as hydrochloric acid, to neutralize and extract the amine. The organic phase then is separated from the aqueous phase, and the nitrile recovered and purified by distillation. The amine can be sprung from its salt for recycling to the reaction zone.

To illustrate the process of the invention, conduct of the process in particular instances is shown in the following example. In these examples, "parts" means "parts by weight" and "parts by weight" bearing the same relationship to "parts by volume" as does the kilogram to the liter.

*Example I*

The reactor consisted of a tube surrounded by an electrical heating element and filled with different adsorptive materials as indicated in Table I. Ammonia and oxygen streams were metered with rotameters, mixed and preheated at 200° C. Pressure in the reactor was atmospheric. The chloride starting material was added just prior to the preheating zone. This starting material contained 69.4% (mole) of 2,6-dichlorobenzal-chloride and 6% (mole) of 2,6-dichlorobenzyl chloride and was obtained by the process as described in Belgian patent specification 610,998. Ammonia and oxygen were used in stoichiometric ratios. Reaction time was 7 seconds. The outlet of the reactor was connected to a receiver. The product from the receiver, containing 2,6-dichlorobenzonitrile, was washed with water, then further purified, either by recrystallization from petroleum ether and/or sublimation at 120–130° C. at atmospheric pressure. The results are summarized on Table I.

TABLE I

| Reaction Temperature | Contact Material | Yield [1] of 2,6-dichlorobenzonitrile (mole percent) |
| --- | --- | --- |
| 310° C | Stainless steel turnings | 27 |
| 315° C | Porous pot (clay shards) | 38 |
| 300° C | Hydrogen fluoride-treated glass beads | 55 |
| 315° C | Coke [2] | 64 |
| 310° C | Porous boiling chips [3] | 74 |

[1] Based on 2,6-dichlorobenzyl/benzalchloride, nitrile content of product was determined by gas chromatography.
[2] Surface area 3 m.²/gram.
[3] Surface area 9.4 m.²/gram.

*Example II*

10 parts of a mixture consisting of 18% (mole) of 2,3,6-trichlorobenzylchloride and 82% (mole) of 2,3,6-trichlorobenzalchloride was passed within a period of 170 minutes over porous boiling chips, together with ammonia (2300 parts by volume/hour) and air (1500 parts by volume/hour). Reaction temperature: 300° C.; contact time: 4½ seconds. Yield of 2,3,6-trichlorobenzonitrile: 88.5% (based on the benzyl/benzalchloride).

*Example III*

(a) 176 parts of p-toluenesulfonyl chloride and 3.5 parts of antimony trichloride were mixed and heated to melting (60–70° C.). Chlorine was passed into the mixture, maintaining the temperature between 60–70° C., until the weight of the reaction product had increased by 64 parts. The product was fractionated to remove mono- and polychlorinated compounds.

Yield of 2,6-dichloro-p-toluenesulfonyl chloride: 202 parts=85%.

Melting point: 63–66° C.; boiling point (11 Torr.): 155–165° C.

(b) A mixture of 154 parts of 2,6-dichloro-p-toluenesulfonyl chloride (crude product), 615 parts by volume of sulfuric acid, and 1230 parts by volume of water was heated under reflux until 2,6- dichloro-p-toluenesulfonyl chloride was dissolved completely (hydrolysis of the acid chloride). The volume of the reaction mixture was reduced by distillation until first traces of 2,6-dichlorotoluene passed over, together with water. The reaction was then completed by distillation with superheated steam of 250° C. The organic layer was separated and fractionated.

Yield of 2,6-dichlorotoluene: 162 parts=65%. Boiling point (12 Torr.): 96–102° C.

(c) 150 parts of 2,6-dichlorotoluene were treated with the calculated amount of chlorine (66 parts) at 180° C., the apparatus was irradiated with an ultra-violet light source to support the formation of chlorine radicals. When the weight had increased by about 33 parts, the reaction was stopped and the mixture was distilled under reduced pressure.

Yield of 2,6-dichlorobenzylchloride: 166 parts=91%. Boiling point (10 Torr.): 119° C.; melting point: 36–37° C.

$C_7H_5Cl_3$ (195.5) Calc.: C, 42.90; H, 2.56; Cl, 54.50. Found: C, 42.55; H, 2.57; Cl, 54.39.

The reaction gave comparable yields without use of light.

(d) 10 parts of 2,6-dichlorobenzylchloride were passed within 2 hours over boiling chips, together with ammonia (2300 parts by volume/hour) and air (300 parts by volume/hour).

Reaction temp.: 300° C.; contact time: 5 seconds.
Yield of 2,6-dichlorobenzonitrile 6.8 parts (=77%).

*Example IV*

(a) 144 parts of 2,6-dichlorotoluene were treated at 180° C. under irradiation by a mercury-lamp with chlorine as described in Example III until increase of weight was 63 parts.

Yield of 2,6-dichlorobenzalchloride: 182 parts=88.5%, Boiling point (13 Torr.): 138° C.; index of refraction $n_D^{20}=1.5893$ $C_7H_4Cl_4$ (229.9) Calc.: C, 36.6; H, 1.75; Cl, 61.7. Found: C, 36.4; H, 1.79; Cl, 61.9.

(b) 10 parts of 2,6-dichlorobenzalchloride were passed within 2 hours over boiling chips, together with ammonia (3000 parts by volume/hour) and air (4500 parts by volume/hour).

Reaction temp.: 350° C.; contact time: 4 seconds.
Yield of 2,6-dichlorobenzonitrile: 6.2 parts (=83%).

*Example V*

2,5-dichlorotoluene was treated with one mole of chlorine at 150° C. while being irradiated. 10 parts of the resulting chlorination mixture, containing 20% of 2,5-dichlorobenzal chloride and 80% of 2,5-dichlorophenyl chloride were passed within 170 minutes over boiling chips, together with ammonia (2300 parts by volume/hour) and air (1600 parts by volume/hour).

Reaction temp.: 300° C.; contact time: 4½ seconds.
Yield of 2,5-dichlorobenzonitrile: 4 parts=62%; Melting point: 130° C.

The resulting nitrile contained 3% of the 2,6-dichloro-isomer.

$C_7H_3NCl$ Calc.: C, 48.8; H, 1.75; Cl, 41.3. Found: C, 48.6; H, 1.62; Cl, 41.4.

We claim as our invention:

1. A process for preparing polychlorobenzonitriles which comprises contacting at a temperature within the range of from about 200° C. to about 400° C. a vaporous mixture consisting of (1) polychlorobenzyl chlorides of the formula

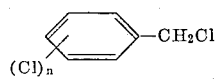

and polychlorobenzal chlorides of the formula

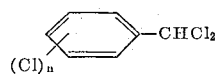

wherein $n$ is an integer of from 2 to 5
(2) ammonia
(3) molecular oxygen with an inert, non-catalytic solid material having a specific surface area of between 1 and 200 square meters per gram.

2. A process for preparing polychlorobenzonitriles which comprises contacting at a temperature within the range of from about 200° C. to about 400° C. a vaporous mixture consisting of
(1) polychlorobenzyl chlorides of the formula

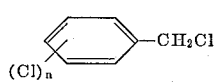

and polychlorobenzal chlorides of the formula

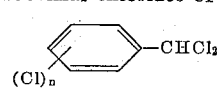

wherein $n$ is an integer of from 2 to 5
(2) ammonia
(3) molecular oxygen diluted with nitrogen with an inert, non-catalytic solid material having a specific surface area of between 1 and 200 square meters per gram.

3. A process for preparing 2,6-dichlorobenzonitrile which comprises contacting at a temperature within the range of from about 200° C. to about 400° C. a vaporous mixture consisting of
(1) at least one member of the group consisting of 2,6-dichlorobenzyl chloride and 2,6-dichlorobenzal chloride,
(2) ammonia and
(3) molecular oxygen with an inert, non-catalytic solid material having a specific surface area of between 1 and 200 square meters per gram.

4. A process according to claim 3 wherein the contact is effected at a temperature of from about 275° C. to about 325° C.

References Cited by the Examiner

UNITED STATES PATENTS

| | | | |
|---|---|---|---|
| 2,339,302 | 1/1944 | Thomas et al. | 252—449 X |
| 2,414,812 | 1/1947 | Houdry | 252—449 X |
| 2,686,161 | 8/1954 | Stewart | 252—449 X |
| 2,838,558 | 6/1958 | Hadley et al. | 260—465 |
| 3,041,368 | 6/1962 | Lind et al. | 260—465 |

OTHER REFERENCES

Mahan et al., Abstract Serial No. 120,606, published June 5, 1951.

CHARLES B. PARKER, *Primary Examiner.*